United States Patent [19]

McDonnell et al.

[11] Patent Number: 4,741,859

[45] Date of Patent: May 3, 1988

[54] THERMOCHROMIC LIQUID CRYSTAL MATERIALS AND DEVICES

[75] Inventors: Damien G. McDonnell; Jennifer Constant, both of Worcester, England

[73] Assignee: The Secretary of State of Defence in Her Britannic Majesty's Government of the United Kingdom of Great Britain and Northern Ireland, London, England

[21] Appl. No.: 875,699

[22] Filed: Jun. 18, 1986

[30] Foreign Application Priority Data

Jun. 19, 1985 [GB] United Kingdom ............... 8515510

[51] Int. Cl.$^4$ ................. G02F 1/13; C09K 19/30; C09K 19/12

[52] U.S. Cl. ................. 252/299.63; 252/299.01; 252/299.66; 252/299.64; 252/299.65; 252/299.61; 252/299.67; 252/299.5; 252/299.7; 350/346; 350/350 R; 350/350 S; 350/351

[58] Field of Search ............ 350/346, , 350 R, 350 S, 350/351; 252/299.01, 299.66, 299.67, 299.64, 299.65, 299.63, 299.61, 299.5, 299.7

[56] References Cited

U.S. PATENT DOCUMENTS

| | | | |
|---|---|---|---|
| 4,022,706 | 5/1977 | Davis ........................ | 252/299.7 |
| 4,077,260 | 3/1978 | Gray et al. .................. | 252/299.66 |
| 4,083,797 | 4/1979 | Oh ............................. | 252/299.66 |
| 4,137,192 | 1/1979 | Matsufuji .................... | 252/299.66 |
| 4,147,651 | 4/1979 | Oh ............................. | 252/299.66 |
| 4,195,916 | 4/1980 | Coates et al. ................ | 252/299.01 |
| 4,219,255 | 8/1980 | Raynes ........................ | 252/299.01 |
| 4,227,778 | 10/1980 | Raynes ....................... | 252/299.01 |
| 4,261,651 | 4/1981 | Gray et al. ................... | 252/299.63 |
| 4,301,054 | 11/1981 | Buirley et al. ................ | 252/299.7 |
| 4,309,304 | 1/1982 | Harrison et al. ............. | 252/299.63 |
| 4,461,715 | 7/1984 | Lu et al. ..................... | 252/299.1 |
| 4,462,924 | 7/1984 | Raynes ........................ | 252/299.63 |
| 4,483,595 | 11/1984 | Irving et al. .................. | 252/299.62 |
| 4,643,842 | 2/1987 | Taguchi et al. .............. | 252/299.67 |

FOREIGN PATENT DOCUMENTS

| | | | |
|---|---|---|---|
| 173581 | 3/1986 | European Pat. Off. ....... | 252/299.63 |
| 56-2370 | 1/1981 | Japan ............................ | 252/299.63 |
| 2080820 | 2/1982 | United Kingdom .......... | 252/299.66 |
| 2134110 | 8/1984 | United Kingdom .......... | 252/299.63 |

OTHER PUBLICATIONS

Songsheng, L., et al., Mol. Cryst Liq. Cryst, vol. 100, pp. 285-297 (1983).

Dunmur, D. A., et al, Mol. Cryst. Liq. Cryst., vol. 122, pp. 321-338 (Jan. 1985).

Oh, C., Mol. Cryst. Liq. Cryst. vol. 42, pp. 1-14 (1977).

Gray, G. W., Electronics Letters, vol. 11, No. 20, pp. 556-557 (1975).

Madeline J. Bradshaw, "Liquid Crystal Devices", Phys. Educ., vol. 18, 1963.

BDH CHemicals Ltd., "Thermochromic Liquid Crystals".

Primary Examiner—Teddy S. Gron
Attorney, Agent, or Firm—Nixon & Vanderhye

[57] ABSTRACT

A novel method of preparing thermochromic liquid crystal mixtures is provided in which mixtures which show an injected smectic phase at lower temperatures than their thermochromic cholesteric phase are prepared, and by following the envelope of the injected smectic - cholesteric transition on the phase diagram a series of thermochromic compositions containing the same components but having a series of working temperature ranges are obtained.

Novel thermochromic liquid crystal mixtures prepared using the method are also provided.

8 Claims, 6 Drawing Sheets

THERMOCHROMIC LIQUID CRYSTAL MATERIALS AND DEVICES

The present invention relates to optically active liquid crystal materials and in particular to thermochromic liquid crystal materials and devices using them.

Thermochromic liquid crystal materials selectively reflect incident white light to show bright iridescent colours and react to changes in temperature by a change in the colour of light they reflect. Such materials are useful in temperature measurement applications including for example thermometry, surface thermography and non-destructive testing.

Thermochromism is shown by liquid crystal materials which have a chiral nematic or cholesteric mesophase, with a helical arrangement of molecules. When the chiral nematic is in the planar texture and the helical pitch is of the order of the wavelength of light, Bragg-like selective reflection occurs. As the temperature changes, the helical pitch changes and the colour of the reflected light also changes. Generally such materials show a smectic mesophase and experience a first-order transition to a chiral nematic mesophase at higher temperatures, the strongest thermochromic effect occurring in the chiral nematic region in the vicinity of the phase transition.

A number of thermochromic liquid crystal materials are known and some are described in UK Pat. Nos. 1556994, 1592161, 1596012, 1596013, 1596014 and 1603076.

Known thermochromic liquid crystal materials suffer from the disadvantage that only a limited number of materials show a smectic phase below their chiral nematic phase and the presence of a smectic phase may in some cases be offset by the presence of undesirable properties such as a low clearing point (ie the disappearance of liquid crystal properties as the material undergoes a phase transition to an isotropic liquid). The usual practice of raising the clearing point by means of an additive may be offset by a corresponding detrimental increase in the melting point and/or the S-Ch transition point of the mixture.

The inventors have invented a novel series of thermochromic liquid crystal materials which overcome some of the problems encountered in known materials. Further objects and advantages of the invention will become apparent from the following description.

According to a first aspect of the invention a liquid crystal material showing thermochromic behaviour over the visible region comprises a mixture of two or more components, which is characterised in that the mixture shows an injected smectic mesophase at a lower temperature than its chiral nematic or cholesteric mesophase.

The term "injected smectic" phase or mesophase used herein means a smectic mesophase in a mixture of components which appears in the composition/temperature phase diagram of the components of the mixture over a composition range intermediate between the terminal compositions represented by the axes of the phase diagram and which is often separated from the axes of the phase diagram by regions of nematic phase.

According to a second aspect of the invention a method of preparing a liquid crystal material showing thermochromic behaviour in the visible region is characterised in that it includes the step of preparing a mixture of at least two components the phase diagram of which mixture shows an injected smectic mesophase.

By means of the invention it is made possible to prepare thermochromic liquid crystal compositions using compounds and materials which do not normally show a smectic mesophase by using a mixture in which an injected smectic phase occupies only the intermediate portion of the composition range.

The appearance of injected smectic phases in nematic materials is normally undesirable since it narrows the useful nematic range of the material for many liquid crystal applications such as twisted nematic electro-optical display devices, the invention provides a novel application for materials which had hitherto been of relatively lower value as liquid crystals.

With liquid crystal mixtures according to the present invention, it is possible to "tune" a mixture or series of mixtures, ie to determine with some precision the influence of composition on the wavelength of light selectively reflected by the mixture. This has been dificult in the past.

According to a further aspect of the invention there is therefore provided a method of preparing a thermochromic liquid crystal composition that includes the steps of:

(i) deciding a required working temperature range (ii) selecting components for the composition which show an injected smectic mesophase over at least part of their temperature-composition phase diagram and a thermochromic cholesteric mesophase at higher temperatures (iii) preparing a thermochromic composition of such components such that the required working temperature range of the composition is in the vicinity of the injected smectic-cholesteric transition temperature of the composition.

Using this latter aspect of the invention, thermochromic liquid crystal mixtures may be prepared whose working temperature ranges may be determined from the phase diagram of the components, and may for example be as low as around $-5°$ C. or as high as around $+50°$ C. A series of thermochromic liquid crystal compositions may thereby be prepared, containing the same components but in different proportions and with varying, eg serial working temperature ranges.

Although such a composition may contain more than two components, for ease of use of the method of this latter aspect of the invention it is convenient to express the phase diagram as a binary system, for example showing no smectic phase at one or both of the composition axes, but with an intermediate injected smectic phase appearing at intermediate positions. Either or both of the compositions represented by the composition axes may be mixtures of compounds or single compounds.

This method is illustrated theoretically in FIG. 1. A binary system of components A and B shows an injected smectic phase S over part of its temperature-composition phase diagram (B also showing an inherent smectic phase), with a cholesteric phase Ch at higher temperatures. Two compositions $C_1$ and $C_2$ containing the same components show their respective sharpest variation of wavelength of selective reflection over the temperature ranges $T_1$–$T_1'$ and $T_2$–$T_2'$, ie in the vicinity of the S-Ch transition. Thus by plotting the envelope of this transition, a series of compositions containing the same components but in different proportions may be prepared.

The envelope of the S-Ch transition may be plotted by known means, for example microscopic observation of a series of compositions as they are heated on a hot stage.

By means of the invention there is provided a thermochromic liquid crystal material comprising a mixture of two or more components (as described above) which shows an injected smectic mesophase at a lower temperature than its chiral nematic mesophase, the colour/temperature dependance of which may be altered by varying the relative proportions of one or more of the components essentially parallel to the injected smectic-chiral nematic phase boundary of its phase diagram.

The choice of and relative proportions of the particular compounds described above for use in a thermochromic mixture according to the invention will depend upon the desired working temperature range (ie colour/temperature dependence range) and sensitivity of the mixture. In all cases the mixture should have a chiral nematic to isotropic (Ch-I) transition temperature above the upper limit of the desired temperature range and a smectic to chiral nematic (S-Ch) transition temperature below the lower limit of the desired temperature range. The desired colour/temperature dependence range should lie in the vicinity of the S-Ch transition for strongest colour/temperature dependence and sensitivity. These parameters for any particular mixture may best be determined by plotting the phase diagram for the mixture, using methods well known in the art. The precise temperature/colour dependence of any particular mixture may be determined by measuring the wavelength or colour of the light reflected by the mixture under consideration and by extropolation or interpolation.

Compositions according to the invention, showing an injected smectic phase may be prepared by mixing one or more nematic components which are "polar", that is have a high positive dielectric anisotropy $\Delta E$ (generally greater than about $+5$) with one or more nematic components which are "non-polar", that is have a low positive, or negative dielectric anisotropy $\Delta E$, (generally between about $+1$ and $-1$).

The polar or non-polar components may themselves exhibit smectic phases, generally termed in the art "inherent" or "natural" smectic phases. On mixing polar and non-polar components these inherent smectic phases are generally suppressed and regions of nematic phase appear in the phase diagram before injected smectic phases apear as the composition of the mixture approaches the centre of the phase diagram.

The polar and non-polar components may be either single compounds or may themselves be mixtures of compounds. If they are single compounds they should exhibit chiral nematic phases with pitches of less than 0.4 μm.

To ensure that the nematic phase shown by the mixture is chiral, the mixture must contain a component which has a chiral centre, ie an assymetric carbon atom. Either the polar component or the non-polar component may possess the chiral centre.

Alternately the polar and non-polar components need not possess a chiral centre, but one or more chiral additives are added to the mixture of polar and non-polar components. The addition of this chiral additive induces the nematic phase of the mixture to be chiral nematic. The chiral additive may itself be either polar or non-polar.

It is preferred to achieve a chiral nematic (cholesteric) phase by the introduction of a chiral compound being a 4'-substituted cyanobiphenyl with a chiral alkyl substituent in the 4-position into the mixture. A particularly preferred substituent is (+)-2-methyl butyl. The preparation of this compound is described in UK Pat. No. 1556994. Compounds of this structure are polar as defined above and may thus advantageously constitute the, or one of the polar components of a mixture according to the invention, and hence contribute directly to the appearance of injected smectic phases, or may alternately be used as a chiral additive in a mixture of otherwise non-chiral polar and non-polar components.

Some 4-chiral alkyl 4¹-cyano biphenyls may exhibit chiral nematic phases and thermochromic behaviour either by themselves or mixed with other cyano biphenyls and/or terphenyls, but their use in thermochromic mixtures with non-polar compounds in systems which exhibit injected smectic phases is novel. Some 4-chiral alkyl 4¹-cyano biphenyls may also exhibit an inherent smectic phase.

Suitable polar compounds which may be used in or as components of compositions according to the invention are generally liquid crystal compounds having one terminal cyano-group on the molecule, for example compounds of the following known classes are suitable:

TABLE 1

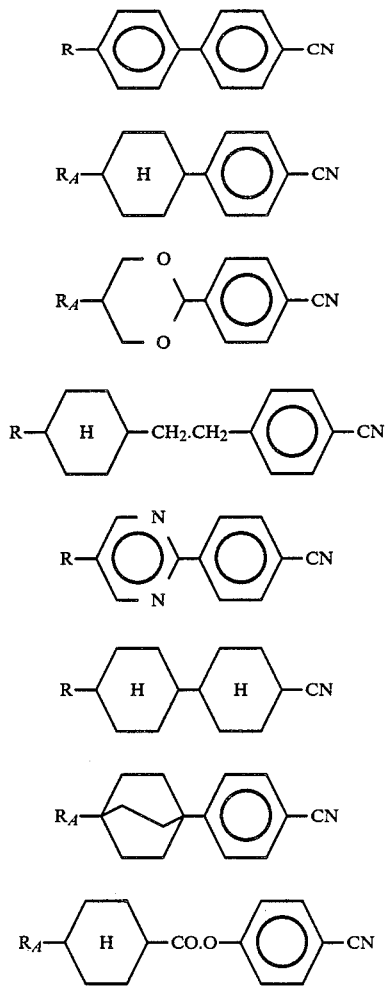

TABLE 1-continued

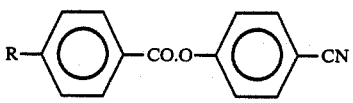

where each R is independently n-alkyl or n-alkoxy and each $R_A$ is independently n-alkyl.

Preferred compounds of the above class are:

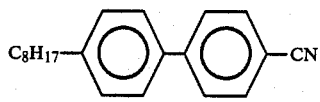

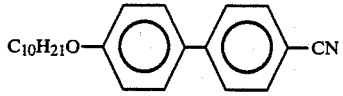

It is particularly preferred to use as a polar component a mixture consisting of:

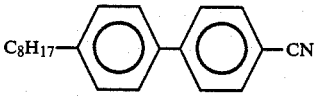

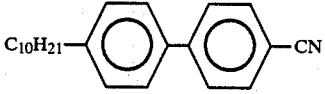

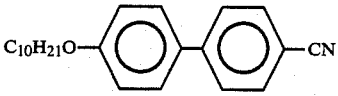

Suitable non-polar compounds which may be used in or as components of compositions according to the invention are generally liquid crystal compounds having two terminal alkyl or alkoxy groups, or one alkyl and one alkoxy group, for example compounds of the following known classes are suitable:

TABLE 2

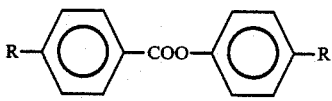

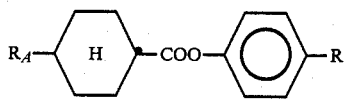

TABLE 2-continued

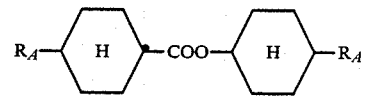

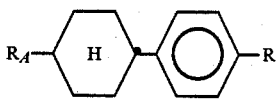

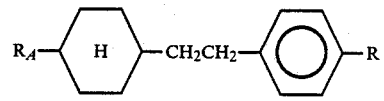

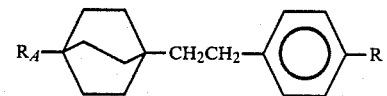

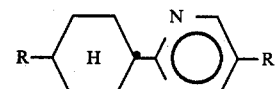

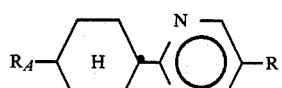

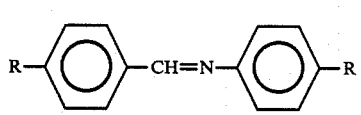

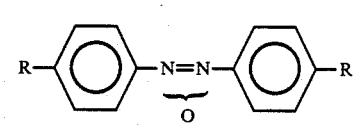

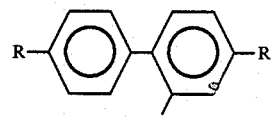

Where each R is independently n-alkyl or n-alkoxy and each $R_A$ is independently n-alkyl. X may be hydrogen or fluorine or chlorine.

Another suitable class of non-polar compounds is the compounds described in co-pending UK patent application No. 8401756 (published as No. 2134110A), of general formula:

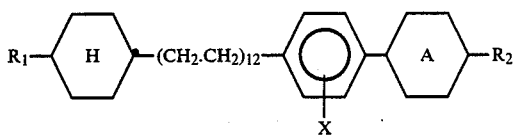

wherein

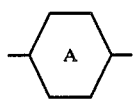

is either

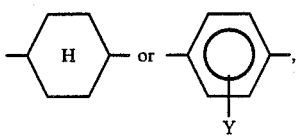

$R_1$ is hydrogen on alkyl having up to 12 carbon atoms, $R_2$ is hydrogen, alkyl having up to 12 carbon atoms, alkoxy having up to 12 carbon atoms

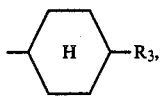

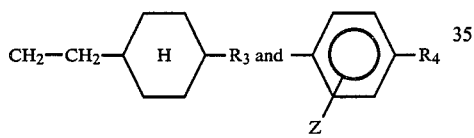

wherein $R_3$ is hydrogen or alkyl having up to 12 carbon atoms and wherein $R_4$ is hydrogen, alkyl having up to 12 carbon atoms or alkoxy having up to 12 carbon atoms; X, Y and Z each independently represents hydrogen or fluorine in one or more of the lateral benzene ring positions provided that at least one of X, Y and Z is present representing fluorine; n=0 or 1 provided that when n=0

$R_2$ is

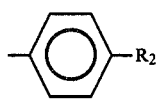

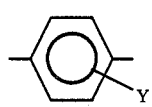

and $R_1$ is alkyl.

Another suitable class of non-polar compounds is the benzoate esters described in co-pending UK patent application No. 8314077 of general formula:

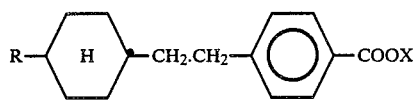

wherein X is an optionally substituted aryl or alicyclic ring structure and R is alkyl; preferably X being optionally substituted phenyl, biphenyl, cyclohexyl, bicyclohexyl, cyclohexyl phenyl or bicyclooctyl.

Particularly preferred non-polar compounds of the above classes are:

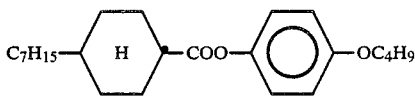

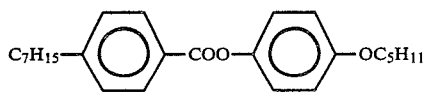

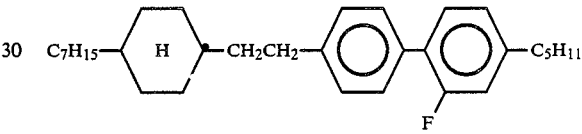

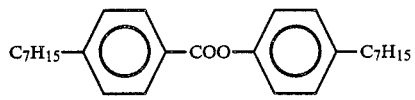

All the above classes of polar and non-polar compounds may contain a chiral centre in the alkyl substituents, a preferred chiral substituent being (+)-2-methyl butyl.

High clearing point additives may also be added to mixtures according to the invention to increase the clearing point, but as mentioned above this may have the disadvantage of raising the melting point and/or S-Ch transition temperature of the mixture.

A suitable high clearing point additive, which may have the disadvantages referred to above is the non-polar compound

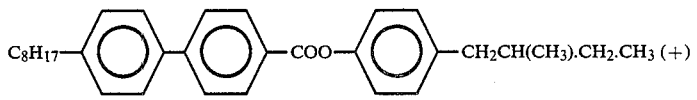

The use in mixtures according to the invention of compounds of low birefringerence may also be advantageous in improving the colour purity, ie spectral sharpness. The width of the spread of relected wavelengths is a function of the birefringerence and the wavelength and hence the smaller the birefringerence the better the colour purity.

Some particularly preferred mixtures according to the invention and which may be prepared using the method described above, are those which contain the compounds whose general formulae are listed below.

For the reasons outlined above, it is preferred to prepare these mixtures as pairs of binary components A and B, which each contain one or more of the compounds as listed, and which components show an injected smectic phase in their binary phase diagram, ie when in a mixture.

In the general formulae below each R is independently selected from n-alkyl containing up to 12 carbon atoms, especially 7-10 carbon atoms, and Rc is optically active (chiral) 2-methylbutyl.

and then slowly cooling the mixture to ambient temperature.

Thermochromic compositions according to the present invention may be used in any of the known methods of use of thermochromic liquid crystal materials for example by depositing a layer of the composition onto a surface (preferably a dark surface), illuminating the layer of the composition from above with white light and looking for hot or cold spots within the temperature range of the composition by looking at the patterns of

| Mixture | A | B |
|---|---|---|
| I | 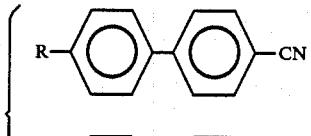<br>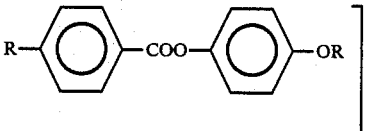 | 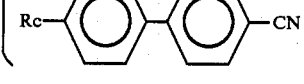<br>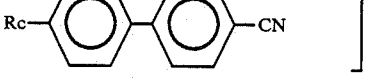 |
| II | 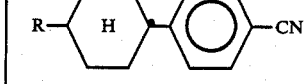<br>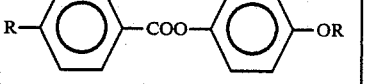 | <br>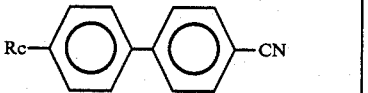 |
| III | 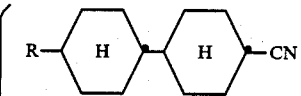<br>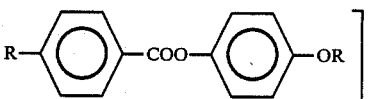 | 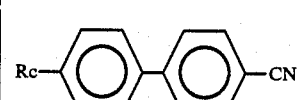<br>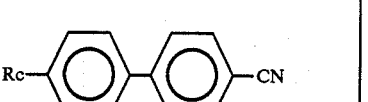 |
| IV | <br>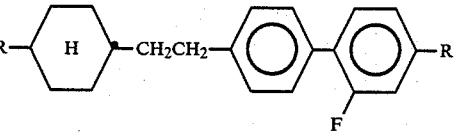 | 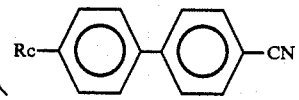<br>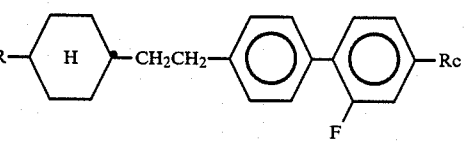 |

The compounds listed above are all either commercially available or else they may be prepared by routes available in the chemical and patent literature, eg UKP No. 1433130 and UKPA No. 2134110A.

Thermochromic liquid crystal compositions according to the invention may be formed in a known way, for example simply by heating the constituent compounds together in the correct weight proportion to form a clear isotropic liquid, raising the temperature of the mixture to above the Ch-I transition temperature, for example usually around 100° C., maintaining the mixture at this temperature for about 5 minutes with stirring reflected light.

According to a further aspect of the invention a temperature sensing device is characterised in that it uses as its temperature dependent element a liquid crystal composition as described above.

According to a further aspect of the present invention a thermochromic ink comprises an aqueous slurry of microencapsulated droplets of a thermochromic composition as described above in polymer shells, or alternately an aqueous slurry of particles of a polymer matrix containing droplets of a composition as described above located in cavities within the polymer matrix. In use, a layer of such an ink may be deposited onto a surface (preferably a dark surface) and the surface may be illuminated from above with white light, when hot or cold spots within the temperature range of the composition on the surface will become apparent in the pattern of reflected light from the deposited layer.

Examples of thermochromic liquid crystal mixtures and the use of the method of the invention will now be described by way of example only with reference to the following drawings in which.

In the examples below the following abbreviations are used:

| Abbreviation | Composition | |
|---|---|---|
| S2 | $C_8H_{17}$—⌬—⌬—CN | 50 wt % |
| | $C_{10}H_{21}$—⌬—⌬—CN | 39 wt % |
| | $C_{10}H_{21}O$—⌬—⌬—CN | 11 wt % |
| CB15 | $CH_3CH_2\overset{*}{C}H(CH_3)CH_2$—⌬—⌬—CN (2-methylbutyl) | |
| ZLI 1167 | A liquid crystal material available from E. Merck GMBH, containing a mixture of compounds of general formula: $C_nH_{2n+1}$—H—H—CN | |
| DE504 | $C_5H_{11}$—H—COO—⌬—$OC_4H_9$ | |
| PCH7 | $C_7H_{15}$—H—⌬—CN | |
| ME705 | $C_7H_{15}$—⌬—COO—⌬—$OC_5H_{11}$ | |
| I75 | $C_7H_{15}$—H—$CH_2CH_2$—⌬—⌬(F)—$C_5H_{11}$ | |
| I42MB | $C_4H_9$—H—$CH_2CH_2$—⌬—⌬(F)—$CH_2\overset{*}{C}H(CH_3)CH_2CH_3$ | |

-continued

| Abbreviation | Composition |
|---|---|
| ME77 | 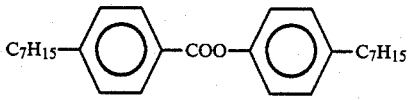 |

("ZLI1167" is a Trade Mark of Merck GMBH). All of the above compounds are available commercially either from BDH Chemicals Ltd (UK) or Merck GMBH, Darmstadt, West Germany.

Figure 1:
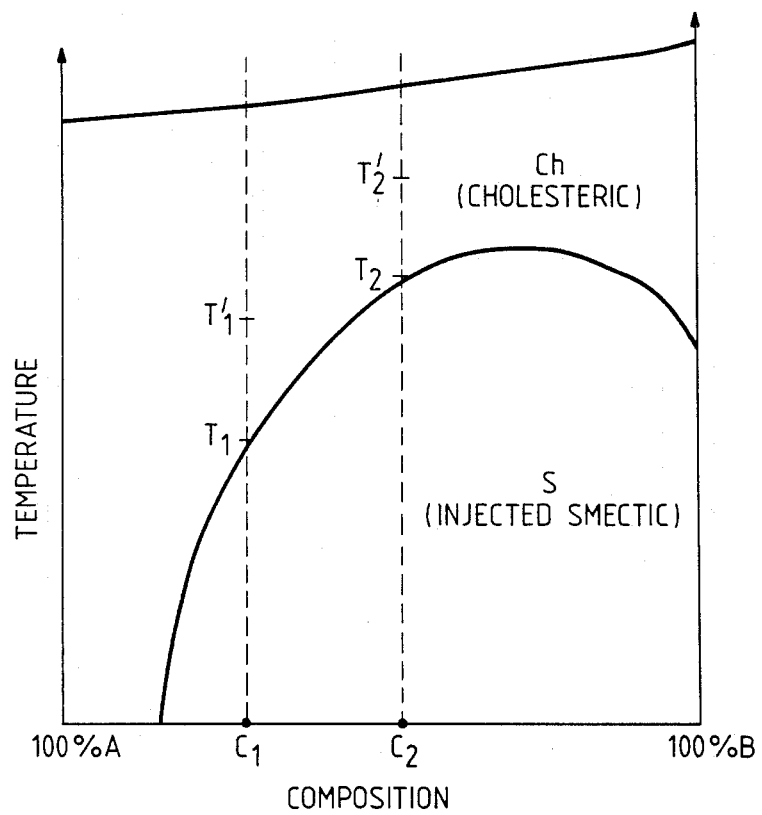
FIG. 1 shows a theoretical phase diagram to illustrate the theoretical basis of the invention as discussed above.
Figure 2:
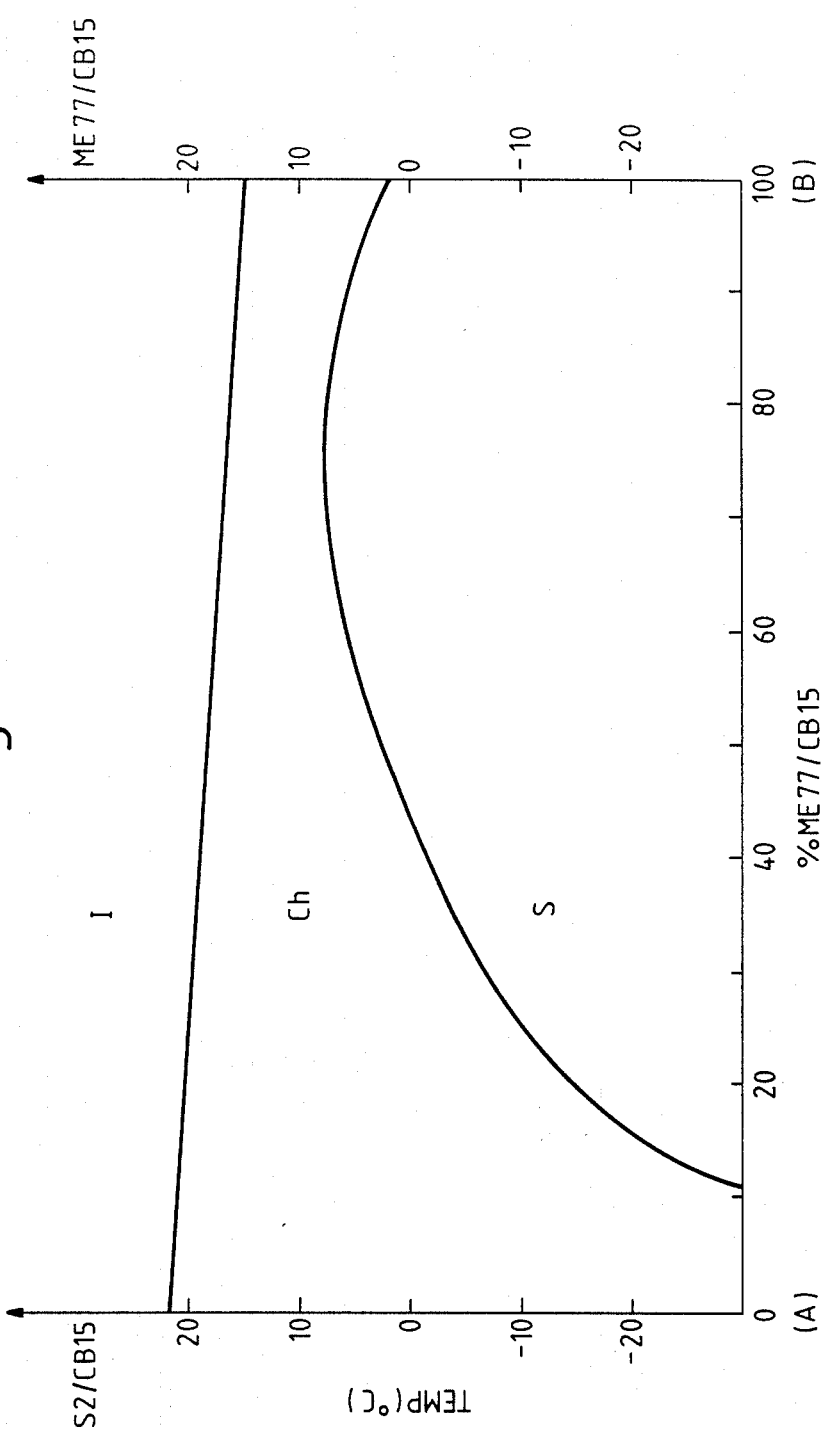
FIG. 2 shows a typical phase diagram of a binary system of components according to the invention.

Referring to FIG. 2 this shows the phase diagram of a mixture according to the invention, exhibiting an injected smectic phase. The diagram is expressed in terms of a binary phase diagram for two components, both of which contain more than one compound, (A) consisting of 60 wt % S2 and 40 wt % CB15 and (B) consisting of 60 wt % ME77 and 40 wt % CB15.

In these components S2 and CB15 are polar, CB15 also being chiral whereas ME77 is non-polar. It should be noted that the smectic phase present in component B, a polar-non polar mixture is also an injected smectic phase not an inherent smectic phase.

Over the temperature range shown in FIG. 2 the mixture shows an injected smectic phase, the S2/CB15 component showing no smectic phase itself.

Figure 3:
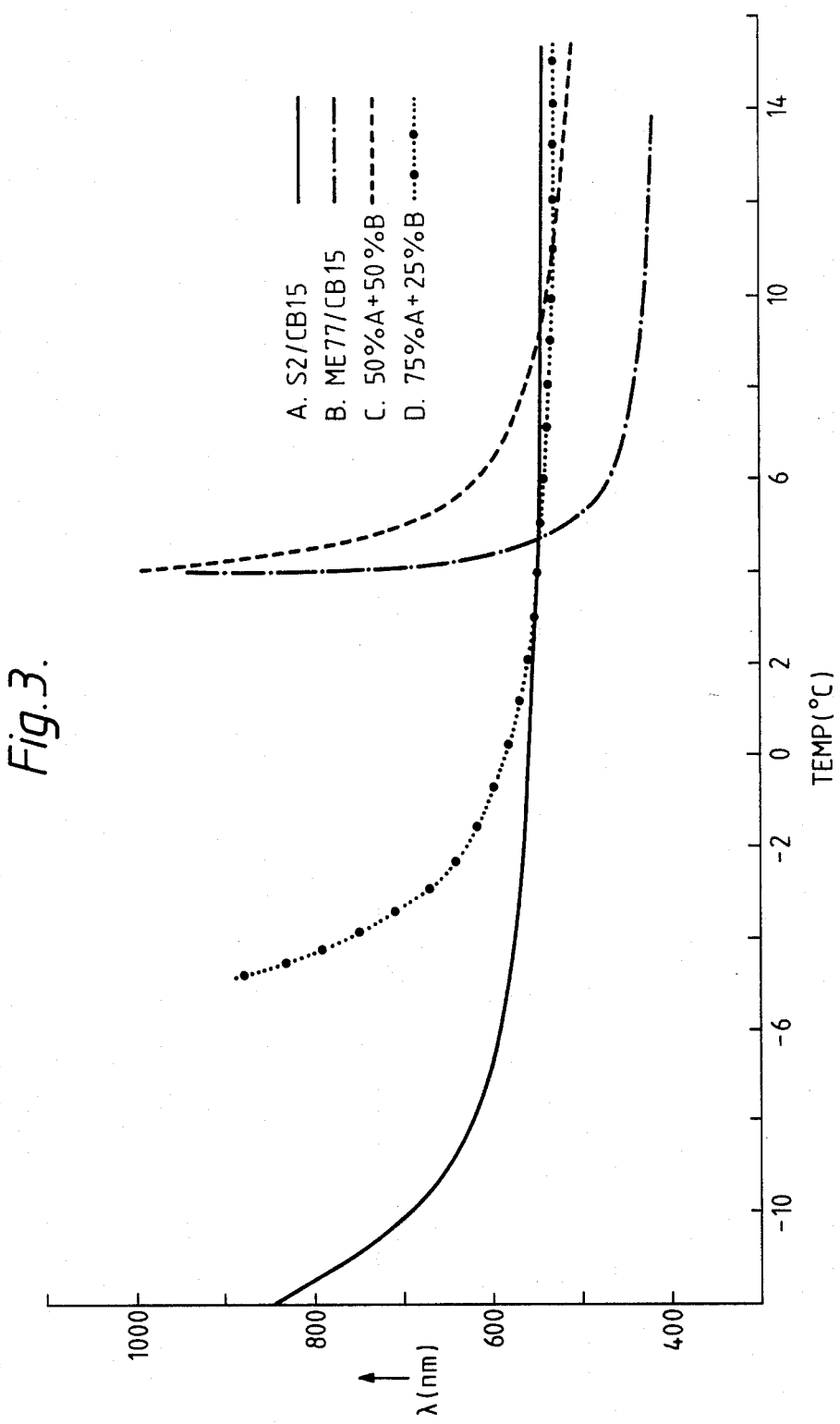
FIGS. 3, 4 and 5 show typical graphs of wavelength of selective reflection of light for compositions according to the invention.

Referring to FIG. 3 this shows the thermochromic properties of a number of compositions illustrated by the phase diagram of FIG. 2 as manifested in a graph of wavelength of selective reflection versus temperature. The graphs for the two components of the phase diagram A and B are shown, as are the graphs for two intermediate compositions, one (C) consisting of 50 wt % A and 50 wt % B and the other (D) consisting of 75 wt % A and 25 wt % B. It can clearly be seen from the graph than the intermediate compositions C and D where an injected smectic phase is present show thermochromic properties and that the colour/temperature dependence becomes most pronounced in the vicinity of the Sm-Ch transition.

Some properties of other mixtures according to the invention are listed in Table 4 below. In each case the composition of the mixture is expressed in terms of a binary phase diagram as described above, in which A and B represent the two terminal compositions.

It will be noted that mixtures C-G show their strongest thermochromism at lower temperatures, ie between about 0°-10° C., whereas mixture H shows its strongest thermochromism at the higher range of about 40°-50° C.

A thermochromic ink according to the invention was made by adding gelatin and gum arabic to a aqueous suspension of micro droplets of any of the above mixtures above 35° C. at a suitable pH. The temperature was allowed to fall and the pH was adjusted so that the gelatin and gum arabic reacted to form a viscous polymer coacervate, which wetted the suspended micro droplets of the mixture, forming a transparent wall around them. Finally the suspension was cooled rapidly to about 10° C. and the wall hardened by addition of an aldehyde. The resulting microencapsulated thermochromic mixture was then filtered, providing a thermochromic ink.

Figure 6:
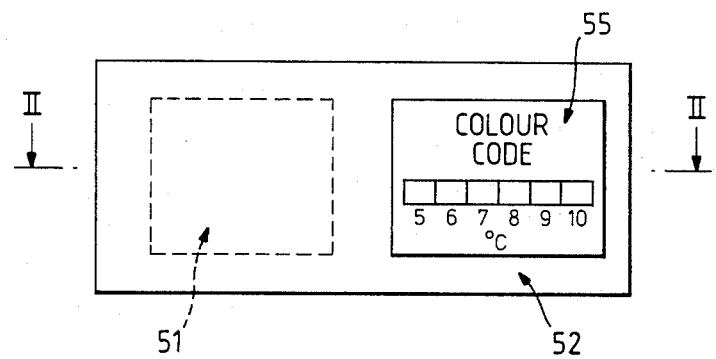
FIG. 6 shows a front view of a temperature sensing device.
Figure 7:
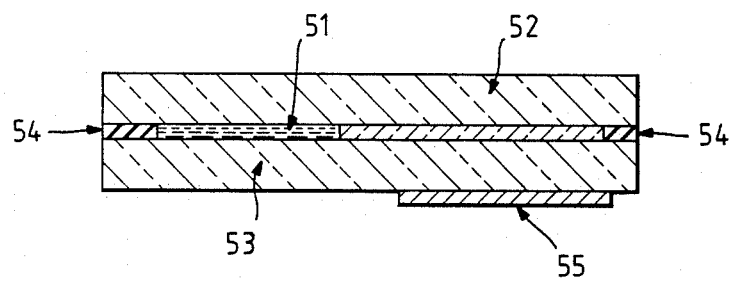
FIG. 7 shows a cross section on the line II—II of the device shown in FIG. 6.

The device illustrated in FIGS. 6 and 7 comprises a region 51 of any of the mixtures described above, in its so called Grandjean plane texture sandwiched between part of the inner surface area of two transparent slides 52 and 53 is filled with a filler 54 made for example of Mylar (Trade Mark). A colour code label 55 is attached to the front of the slide 52 in an area distinct from that occupied by the region 51.

In use, as the temperature of the device changes, the colour of the light reflected from the region 51 changes. The label 55 provides a colour code which an observer may compare with the colour of the reflected light, relating colour to temperature. The device may be used as a household thermometer.

Several methods are know in the art for producing a sandwich structure as shown in FIGS. 6 and 7 with the mixture in its Grandjean plane texture. For example, one method is described in U.S. Pat. No. 3,440,882. A layer of the mixture is spread on part of a sheet of acetate glass or Mylar (Trade Mark). A filler layer is then

TABLE 4

| Ref | Materials Used A (wt %) | Materials Used B (wt %) | Composition A (wt %) | Composition B (wt %) | Sm-Ch (°C.) | Ch-I (°C.) |
|---|---|---|---|---|---|---|
| E | S2 60<br>CB15 40 | DE5/04 60<br>CB15 40 | 30 | 70 | +3 | +32 |
| F | PCH7 60<br>CB15 40 | ME705 60<br>CB15 40 | 30 | 70 | −1 | +25.3 |
| G | ZLI1167 60<br>CB15 40 | ME705 60<br>CB15 40 | 30 | 70 | −2 | +29.5 |
| H | S2 60<br>CB15 40 | I75 50<br>I42MB 50 | 25 | 75 | +42 | +72 |

Figure 4:
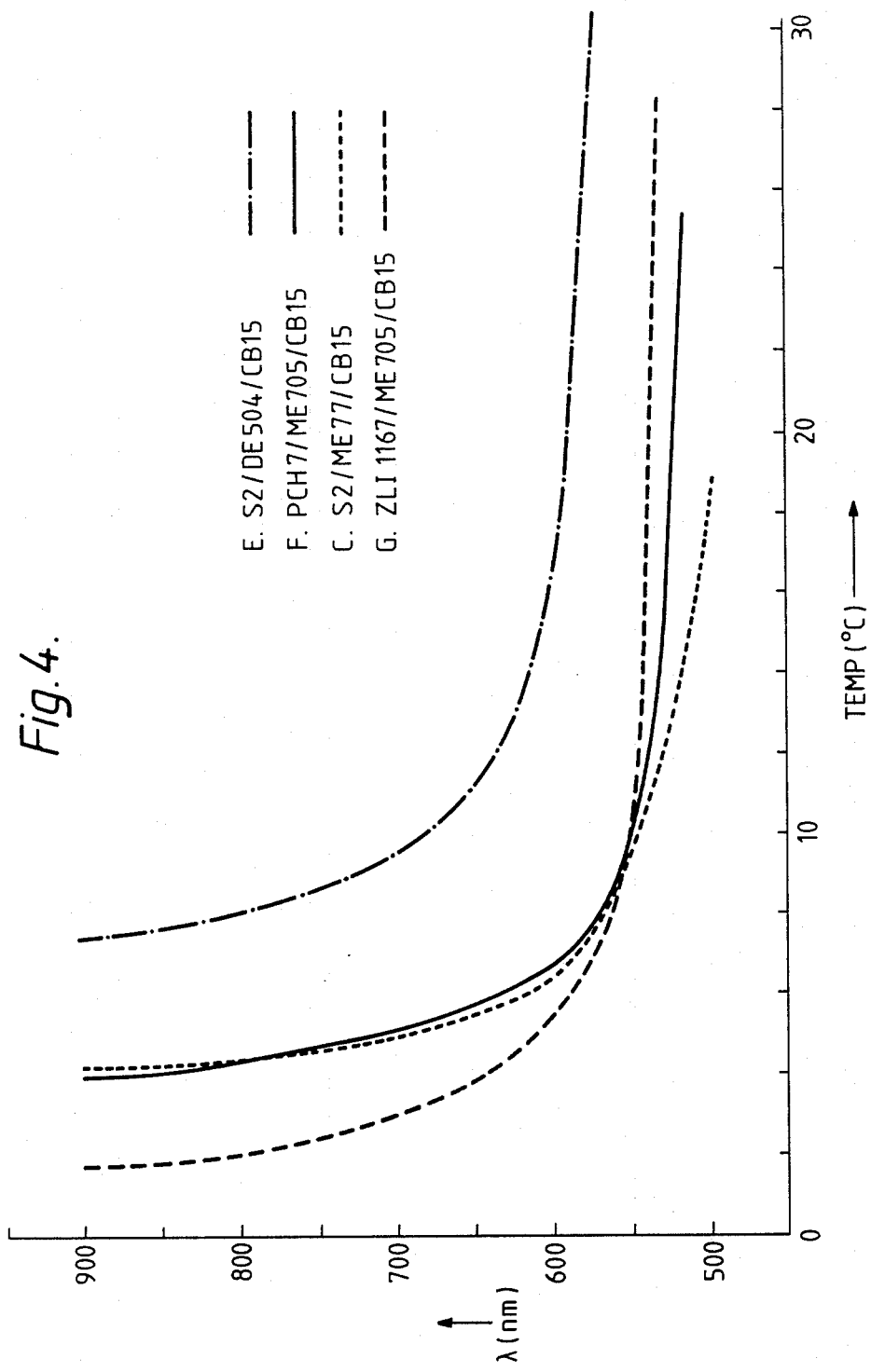
Figure 5:
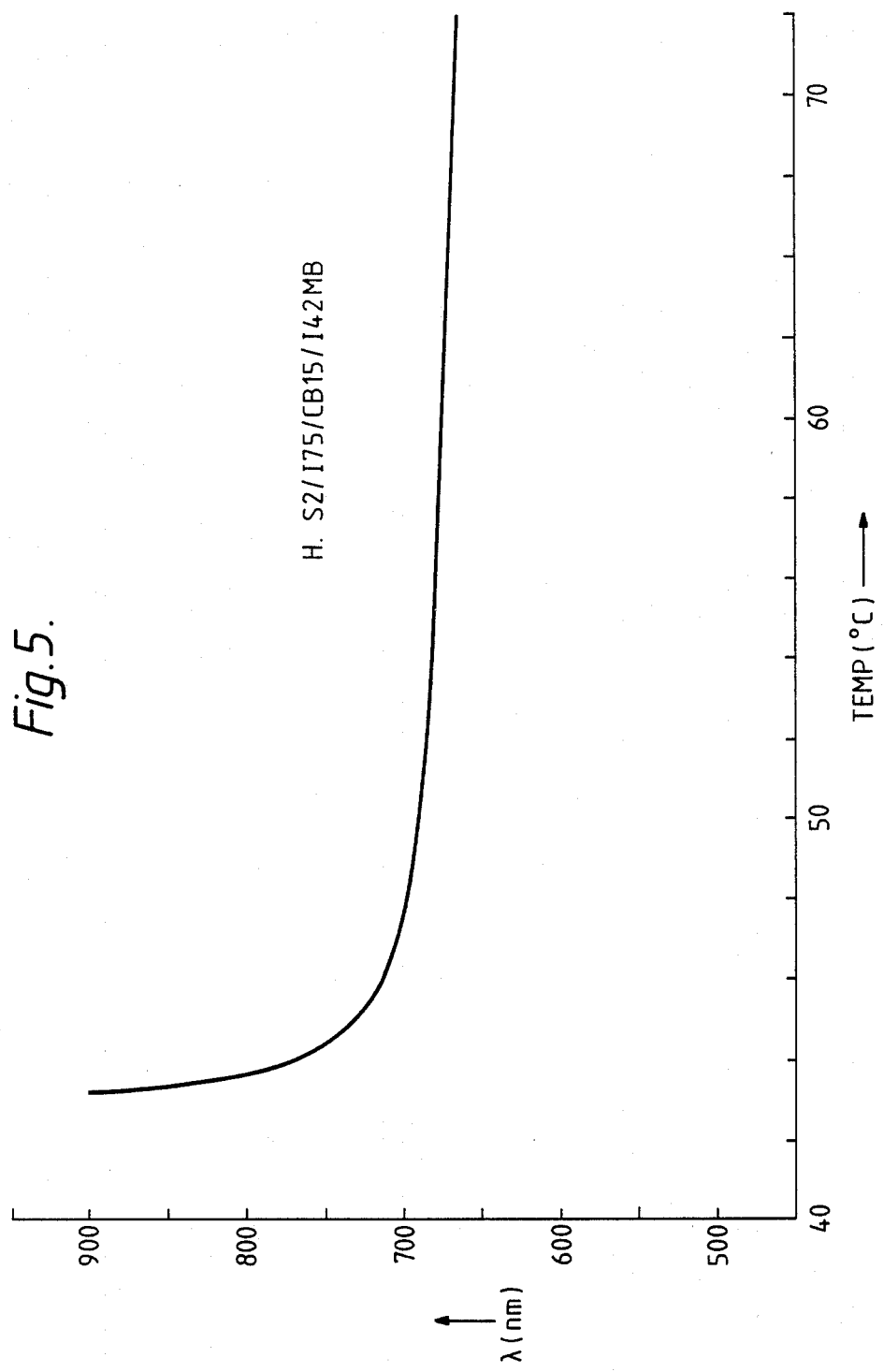

The thermochromic properties of the above mixtures, referred to for convenience as mixtures E-H are shown in the graphs of wavelength of selectively reflected light versus temperature in FIGS. 4 and 5. In FIG. 4 the mixture C is included for comparison.

added and a further sheet of acetate glass or Mylar is used to complete the sandwich. The sandwich is then placed between two metal blocks of approximately the same surface area as the sheets. The blocks are then heated to a temperature of 40°-50° C. whilst being pressed together to exert a force of about 5lb on the sandwich. The metal blocks and the sandwich are then placed in a vacuum chamber and the pressure in the chamber is reduced to about 10 mm Hg for about a minute. After this time air is admitted providing a thin uniform liquid crystal layer in the sandwich.

What is claimed is:

1. A liquid crystal material showing thermochromic behavior in a cholesteric mesophase over the visible region comprising a mixture of two or more components, characterised in that the mixture shows an injected smectic phase at a lower temperature than its cholesteric mesophase, said material containing one or more of each of the compound types having general formulae:

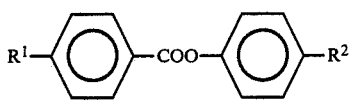

where R is selected from n-alkyl and n-alkoxy containing up to 12 carbon atoms and $R^1$ and $R^2$ are independently selected from n-alkyl containing up to 12 carbon atoms and Rc represents optically active 2-methylbutyl.

2. A liquid crystal material showing thermochromic behavior in a cholesteric mesophase over the visible region comprising a mixture of two or more components, characterised in that the mixture shows an injected smectic phase at a lower temperature than its cholesteric mesophase, said material containing one or more of each of the compound types having general formulae:

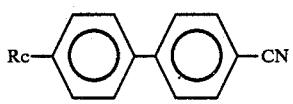

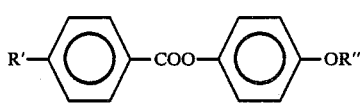

where R, R' and R" are independently selected from n-alkyl containing up to 12 carbon atoms and Rc represents optically active 2-methylbutyl.

3. A liquid crystal material showing thermochromic behavior in a cholesteric mesophase over the visible region comprising a mixture of two or more components, characterised in that the mixture shows an injected smectic phase at a lower temperature than its cholesteric mesophase, said material containing one or more of each of the compound types having general formulae:

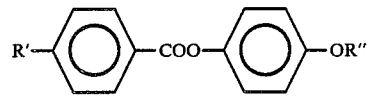

where R, R', and R" are independently selected from n-alkyl containing up to 12 carbon atoms and Rc represents optically active 2-methylbutyl.

4. A liquid crystal material showing thermochromic behavior in a cholesteric mesophase over the visible region comprising a mixture of two or more components, characterised in that the mixture shows an injected smetic phase at a lower temperature than its cholesteric mesophase, said material containing one or more of each of the compound types having general formulae:

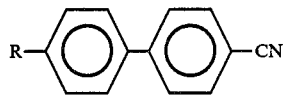

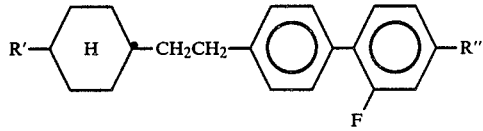

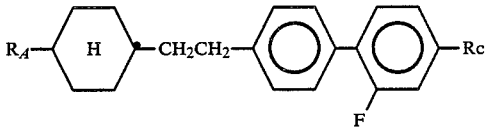

where R, R', R" and $R_A$ are independently selected from n-alkyl containing up to 12 carbon atoms and Rc represents optically active 2-methylbutyl.

5. A thermochromic liquid crystal mixture according to claim 1, 2, 3 or 4, characterised in that the groups R, $R^1$, $R^2$, R', R" and $R_A$ contain 7 to 10 carbon atoms each.

6. A liquid crystal material according to claim 1 wherein the compounds in the mixture include those where R is $C_8H_{17}$, $C_{10}H_{21}$ and $C_{10}H_{21}O$, and $R^1$ and $R^2$ are both $C_7H_{15}$.

7. A thermochromic ink characterised in that it contains microencapsulated droplets of a liquid crystal composition according to claim 1, 2, 3 or 4.

8. A temperature indicating device, characterised in that it includes a liquid crystal mixture according to claim 1, 2, 3 or 4.

* * * * *